US012410863B2

(12) United States Patent
Callesen et al.

(10) Patent No.: US 12,410,863 B2
(45) Date of Patent: Sep. 9, 2025

(54) METHOD FOR SWITCHING AN ELECTRICALLY SHIFTABLE TRANSMISSION FOR A VEHICLE, AND ELECTRICALLY SHIFTABLE TRANSMISSION

(71) Applicant: ZF CV Systems Global GmbH, Bern (CH)

(72) Inventors: Matthias Callesen, Wennigsen (DE); Uwe Winkelholz, Wennigsen (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/909,195

(22) Filed: Oct. 8, 2024

(65) Prior Publication Data

US 2025/0116328 A1 Apr. 10, 2025

(30) Foreign Application Priority Data

Oct. 9, 2023 (EP) ..................... 23202412

(51) Int. Cl.
*F16H 61/02* (2006.01)
(52) U.S. Cl.
CPC ............... *F16H 61/0213* (2013.01)
(58) Field of Classification Search
CPC .... F16H 61/0213; F16D 48/064; F16D 48/10; F16D 2500/10462
See application file for complete search history.

(56) References Cited

U.S. PATENT DOCUMENTS

| 9,506,509 | B1* | 11/2016 | Fowler | F16D 48/06 |
| 2008/0109143 | A1 | 5/2008 | Bartels et al. | |
| 2023/0364990 | A1* | 11/2023 | Feroz | B60K 17/356 |

FOREIGN PATENT DOCUMENTS

| DE | 69402779 T2 | 11/1997 |
| DE | 102010018404 A1 | 10/2011 |
| DE | 102018106939 A1 | 9/2019 |
| FR | 2948161 A1 | 1/2011 |
| GB | 1442206 A | 7/1976 |

\* cited by examiner

*Primary Examiner* — Edwin A Young
(74) *Attorney, Agent, or Firm* — Dickinson Wright PLLC

(57) ABSTRACT

A method (100) for shifting an electrically shiftable transmission (230) for a vehicle (200*a*), in particular a commercial vehicle (200*b*) includes detecting (110) a state (237) of a shifting element (235) relating to a blocking position (231) of a shifting element (235) relative to a further shifting element (236). A control signal (255) for controlling a movement of the shifting element (235) is determined, taking into account the detection of the blocking position (231). The control signal (255) defines a target variable (Z) of the movement of the shifting element (235) and an oscillation (O) about the target variable (Z). The control signal (255) is output and moves the shifting element (235) out of the blocking position and into a final position of engagement with the further shifting element (236).

20 Claims, 2 Drawing Sheets

METHOD FOR SWITCHING AN ELECTRICALLY SHIFTABLE TRANSMISSION FOR A VEHICLE, AND ELECTRICALLY SHIFTABLE TRANSMISSION

FIELD

The present disclosure relates to a method for shifting an electrically shiftable transmission for a vehicle, in particular a commercial vehicle. The present disclosure also relates to a computer program and/or computer-readable medium, a control device for a vehicle, in particular a commercial vehicle, with an electrically shiftable transmission, an electrically shiftable transmission with a shifting element, an axle arrangement for a vehicle, in particular a commercial vehicle, and a vehicle, in particular a commercial vehicle.

BACKGROUND

So-called dog clutches for shifting transmissions are particularly well known for commercial vehicles. To accomplish a gear shift, a shifting element of the transmission is moved by an actuator to be brought into operative connection with another shifting element and/or to resolve such an operative connection. In particular, in pneumatically shiftable transmissions, blocking positions are known to be a typical and recurring condition in which the two shifting elements are, for example, in a tooth-to-tooth position, which hinders meshing movement. Furthermore, particularly under load, decoupling of two intermeshing shifting elements can be made difficult and/or practically impossible by torques acting between the shifting elements (so-called "sticking") and thus a blocking position can occur.

To resolve a blocking position, typically in a pneumatically shiftable transmission, a force for moving the shifting element is increased to resolve the blocking position and, if the blocking position cannot be eliminated, the force is removed and the shifting process is attempted again.

A blocking position can lead to a delay in the shifting time, because increasing the force, eliminating the blocking position, and a possible repeat of the shifting process take time. Furthermore, such blocking positions can lead to a reduction in the service life of the transmission elements. The forces generated during gear shifting can result in high mechanical stresses, which means that the transmission typically has to be designed in a complex and elaborate way to withstand the forces.

Electrically shiftable transmissions are known from the prior art. A target position and/or a movement of an electric shift actuator is set similar to the target position of a pneumatic shift actuator. The target position is specified and the shift actuator adjusts a movement of the shifting element of the transmission according to the demand using a force.

DE 694 02 779 T2 discloses a method for controlling a force exerted on a shifting mechanism of an automatic mechanical transmission during a shifting process, the transmission having at least one shift rail, the shifting mechanism including a shifting finger driven by a motor, the shifting finger cooperating with the shift rail to effect shifting of the transmission, the method comprising energizing a motor with a pulse width modulated control signal with variable duty cycle to generate a target current which is applied to the motor and detecting the current drawn by the motor, continuously readjusting the duty cycle of the control signal during a shifting process as a function of the error sum between the detected current and the target current plus the rate of change of the error to reduce the error to zero. The motor is connected to a direct current source, such as, e.g., the vehicle battery.

Control electronics carry out all relevant computing operations and ensure communication with other electronic systems in the vehicle. Said control electronics control the motor according to the described method and convert the direct current, e.g., from the vehicle battery, into suitable phase currents of the motor.

SUMMARY

The underlying object of the present disclosure is to provide an improved method for shifting an electrically shiftable transmission. In particular, the present disclosure can achieve the object of effectively eliminating and/or preventing a blocking position.

The object is achieved by the method and the subject matter according to the present disclosure. Further developments of the present disclosure are described herein.

According to the present disclosure, a method for shifting an electrically shiftable transmission for a vehicle, in particular a commercial vehicle, is provided. The method includes: detecting a state of a shifting element of the transmission relating to a blocking position of the shifting element; determining a control signal for controlling a movement of the shifting element taking into account the detected state and/or the blocking position, wherein the control signal defines a target variable of the movement of the shifting element and an oscillation about the target variable; and outputting the control signal and moving the shifting element based on the control signal.

It was recognized that with an electrically shiftable transmission it is possible to detect and control the movement of the shifting element in a more differentiated manner than with, for example, a pneumatically shiftable transmission. This makes it possible to detect the state of the shifting element in which the blocking position is detected and/or can be predicted. For example, the state of the shifting element can characterize a movement of the shifting element caused by a shift actuator for moving the shifting element.

To resolve and/or prevent the blocking position, the movement of the shifting element is adjusted by determining the control signal, such that the oscillations or pulses are imposed on a target variable characterizing the movement. In other words, the movement of the shifting element is controlled according to the target variable. In addition to the target variable, the oscillation is imposed on the control signal. The oscillations may be any temporal change of the target variable, which, in particular alternatingly, increases and decreases the target variable. In other words, the oscillation may be a harmonic oscillation, may be composed of a plurality of harmonic oscillations, and/or may be a non-harmonic oscillation.

The present disclosure has recognized that it is thus possible to generate a dynamic force between the shifting element and the further shifting element, which leads to a higher probability of eliminating the blocking position. The oscillation can cause micro-movements that resolve and/or prevent the blocking position. This improves the shifting performance and reduces the time required to perform a shifting process. High mechanical stress on the transmission caused by excessive force can thus be prevented. This enables a more targeted and effective design of the transmission components, which can lead to cost reduction.

Optionally, the state of the shifting element indicates the blocking position. This makes it possible to effectively characterize the blocking position. For example, the state of the shifting element may be defined by a position of the shifting element which can be detected via a position sensor and optionally does not change over a predetermined time interval. Alternatively, or additionally, the state of the shifting element indicates the blocking position resulting from a movement of the shifting element. It was recognized that a blocking position can be prevented if the blocking position is predicted based on the movement of the shifting element. The movement of the shifting element can be detected to determine, based on a prediction of the position of the shifting element, whether a further movement of the shifting element could potentially result in a blocking position.

Optionally, the target variable includes a force, a velocity, and/or a position. This allows the target variable to be controlled depending on the application. The velocity and/or position can be effectively controlled by the electrical shiftability of the transmission.

Optionally, the oscillation defines a frequency of the movement of the shifting element. The oscillation may be a harmonic or sinusoidal oscillation. The frequency of the movement may be a characteristic, a minimum, and/or a maximum frequency. Optionally, the oscillation may define a plurality of frequencies of the movement of the shifting element to achieve more complex oscillations with different time scales to achieve different micro-movements.

Optionally, the oscillation is dependent on a speed difference between the shifting element and a further shifting element that can be brought into operative connection with the shifting element. This means that the oscillation of the movement of the shifting element may depend on the speed difference between the two shifting elements. This allows two variables characterizing the kinematics of the shifting process to be coordinated with one another. In particular, a frequency and/or an amplitude of the oscillation may be dependent on the speed difference.

Optionally, the determination of the control signal is carried out such that a force on the shifting element falls below a force threshold. This makes it possible to limit the oscillation. By falling below the force threshold, it is possible to ensure that no excessive forces act on components of the transmission, which can have a positive influence on the design and layout of the transmission. Accordingly, the force threshold may be selected by the design of the transmission and/or the design of the transmission may be adjusted to a force threshold to be achieved.

Optionally, the method includes: detecting the vacating of the blocking position; determining an adjusted control signal for controlling the movement of the shifting element after the blocking position is vacated, wherein the adjusted control signal defines a target variable of the movement of the shifting element without the oscillation; and, outputting the adjusted control signal for moving the shifting element based on the adjusted control signal. It was recognized that it is possible to transition to oscillation-free control of the shifting element after the blocking position has been resolved to enable effective shifting.

According to a further aspect of the present disclosure, a computer program and/or computer-readable medium is provided. The computer program and/or computer-readable medium comprises commands which, when the program or commands are executed by a computer, cause the computer to carry out the method and/or the steps of the method described herein. The computer program and/or computer-readable medium may include commands to carry out steps of the method described as optional to achieve a corresponding technical effect.

According to a further aspect of the present disclosure, a control device for a vehicle, in particular a commercial vehicle, with an electrically shiftable transmission is provided. The control device may be configured to carry out steps of the method described as optional to achieve a corresponding technical effect.

According to a further aspect of the present disclosure, an electrically shiftable transmission is provided. The electrically shiftable transmission has a shifting element and the control device described above. Optionally, the electrically shiftable transmission is an automated manual transmission (AMT).

According to one aspect of the present disclosure, an axle arrangement for a vehicle, in particular a commercial vehicle, is provided. The axle arrangement has the electrically shiftable transmission described above. The axle arrangement and/or the control device of the electrically shiftable transmission may be configured to carry out steps of the method described as optional and/or advantageous to achieve a corresponding technical effect.

According to a further aspect of the present disclosure, a vehicle, in particular a commercial vehicle, is provided. The vehicle has an electrically shiftable transmission with the control device described herein and/or the axle arrangement described above. The vehicle and/or the control device may be configured to carry out steps of the method described as optional and/or advantageous to achieve a corresponding technical effect.

BRIEF DESCRIPTION OF THE DRAWINGS

Further advantages and features of the present disclosure as well as their technical effects can be derived from the figures and the description of the preferred embodiments shown in the figures. In the figures.

DETAILED DESCRIPTION

Figure 1:
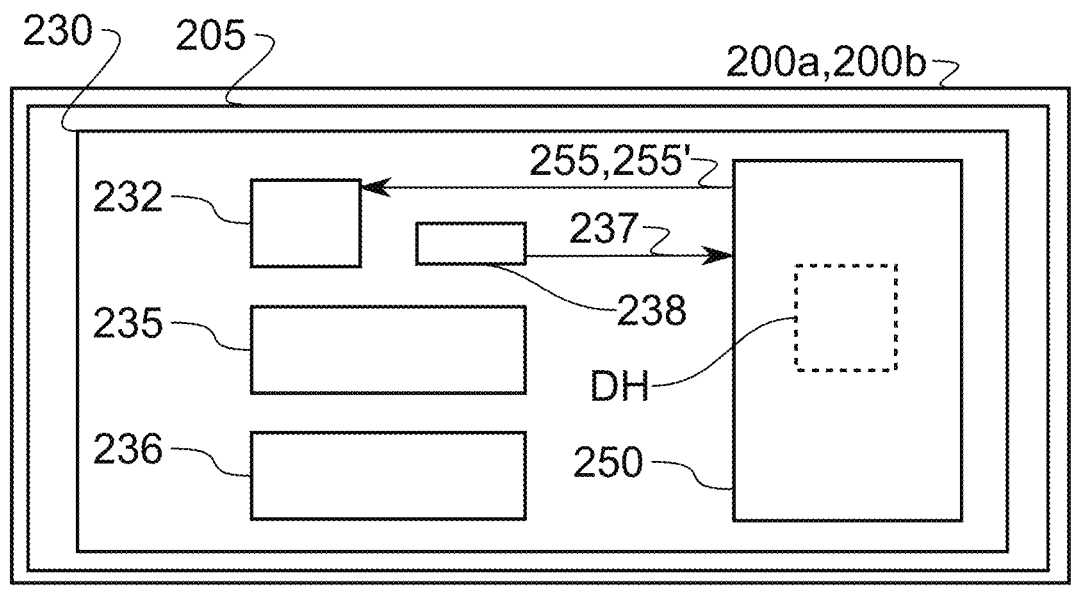
FIG. 1 is a schematic illustration of a vehicle, in particular a commercial vehicle, according to an embodiment of the present disclosure.

FIG. 1 is a schematic illustration of a vehicle 200a, in particular a commercial vehicle 200b, according to an embodiment of the present disclosure. The vehicle 200a, in particular a commercial vehicle 200b, is hereinafter referred to as vehicle 200a, 200b. The vehicle 200a, 200b is a land vehicle. The vehicle 200a, 200b is, for example, a truck, a bus and/or a tractor unit of a multi-unit vehicle.

The vehicle 200a, 200b is configured to carry out the method 100 described with reference to FIG. 3. For this purpose, the vehicle 200a, 200b comprises an electrically shiftable transmission 230. The electrically shiftable transmission 230 has a shifting element 235 and a further shifting element 236. A shifting process is achieved, for example, by bringing the shifting element 235 from a neutral position 233 into engagement with the further shifting element 236 in an end position 234 (see FIG. 2). In this case, a distance between the shifting element 235 and the further shifting element 236 changes. A variable describing the distance between the shifting element 235 and the further shifting element 236 is referred to below as position P. Each of the shifting elements 235, 236 can rotate at a speed. A speed difference DH can occur between the shifting element 235 and the second shifting element 236.

To set and/or control the position P, the transmission 230 comprises a control device 250 and a controllable electric shift actuator 232 for actuating the shifting element 235. The controllable electric shift actuator 232 comprises, for example, an electronically commutated synchronous motor or a brushless DC motor as a servomotor.

The control device 250 is further configured to carry out the method 100 described with reference to FIG. 3 to carry out a shifting of the electrically shiftable transmission 230.

For this purpose, the transmission 230 has a position sensor 238 connected to the control device 250. The position sensor 238 is configured to detect the position P of the shifting element 235. The control device 250 is configured to receive the position P from the position sensor 238. Based on the position P, the control device 250 can detect the movement of the shifting element 235 and a state 237 relating to a blocking position 231 (see FIG. 2) of the shifting element 235. The state 237 can indicate the position P of the shifting element 235 in the blocking position 231 and/or a blocking position 231 resulting from a movement of the shifting element 235. Furthermore, the detected position P can be used to determine whether the blocking position 231 has been vacated. The control device 250 is configured to detect and/or determine the speed difference DH between the shifting element 235 and the second shifting element 236.

The control device 250 is configured to determine a control signal 255 and an adjusted control signal 255'. The control signal 255 for controlling the movement of the shifting element 235 is determined taking into account the state 237 and/or the blocking position 231, wherein the control signal 255 defines a target variable Z of the movement of the shifting element 235 and an oscillation O about the target variable Z (see FIG. 2). When it has been detected that the blocking position 231 has been vacated, the adjusted control signal 255' can be determined for controlling the movement of the shifting element 235 after the blocking position 231 has been vacated, wherein the adjusted control signal 255' defines a target variable Z of the movement of the shifting element 235 without the oscillation O (see FIG. 2). The control signal 255 and the adjusted control signal 255' are described with reference to the movement profile 300 according to FIG. 2.

As shown in FIG. 1, the control device 250 and the shift actuator 232 are connected to one another by way of communication technology so that the control device 250 can transmit or output the control signal 255 and the adjusted control signal 255' to the shift actuator 232 for moving the shifting element 235.

Figure 2:
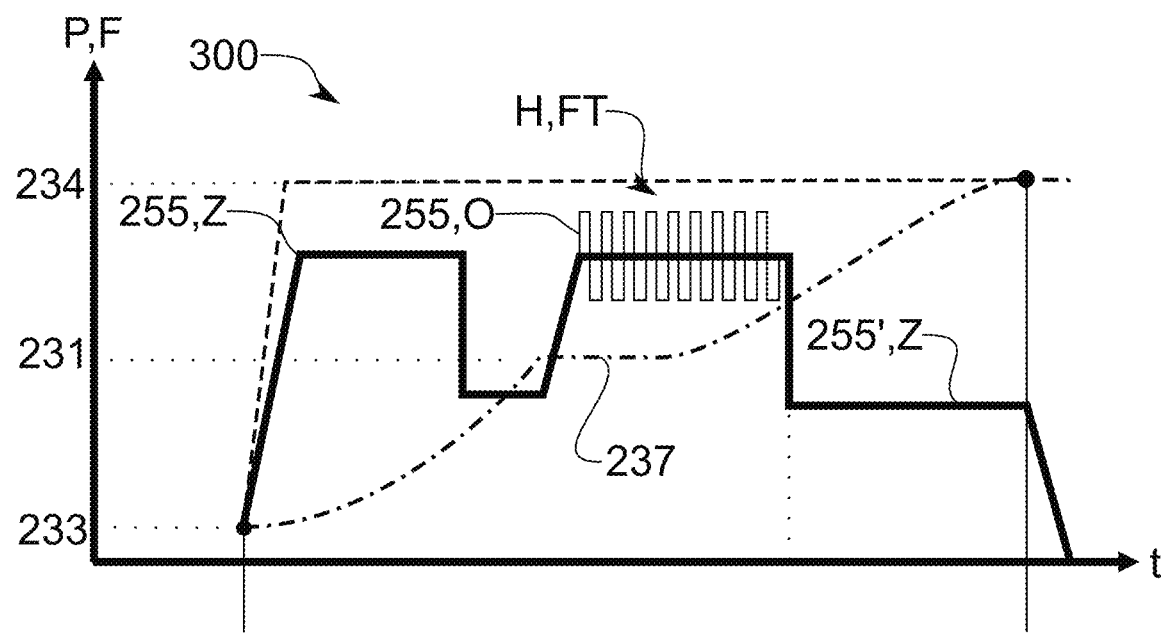
FIG. 2 is a schematic illustration of a movement profile for moving a shifting element of an electrically shiftable transmission according to an embodiment of the present disclosure.

FIG. 2 shows a schematic illustration of a movement profile 300 for moving a shifting element 235 of an electrically shiftable transmission 230 according to an embodiment of the present disclosure. Such a transmission 230 is described with reference to FIG. 1. FIG. 2 is described with reference to FIG. 1 and its description.

The movement profile 300 according to FIG. 2 defines a relationship between the position P and a force F as a function of time t, in each case on an arbitrary scale. Time t is plotted as ordinate (value on the x-axis) and the position P and the force F are plotted as abscissa (value on the y-axis). A neutral position 233, a blocking position 231, and an end position 234 are illustrated as position P.

In a case without blocking in the blocking position 231, the shifting element 235 can be moved from the neutral position 233 to the end position 234 by a comparatively fast movement, see the dashed line illustrating the position P of the shifting element 235.

The dot/dash line shows the position P of the shifting element 235 during a movement in which the shifting element 235 moves into the blocking position 231. The force F for moving the shifting element 235 is controlled as the target variable Z. In another embodiment, the target variable Z may also comprise a velocity and/or a position P of the shifting element 235.

Before the shifting element 235 reaches the blocking position 231 in FIG. 2, the shifting element 235 is moved in a force-controlled manner, as indicated by the curvature of the position P. The force F as target variable Z is the control variable 255 for the movement of the shifting element 235 and is shown as a thick (bold) solid line. Before the shifting element 235 and the further shifting element 236 mesh, the force F is reduced to enable smooth and thus gentle and quiet meshing and shifting.

However, the shifting element 235 reaches the blocking position 231. The shifting element 235 remains in the blocking position 231 for a short time (illustrated by the dot/dash line being flat at 237 in FIG. 2). The position P is detected in the blocking position 231 for a time interval and thus corresponds to the state 237 that the shifting element 235 is in the blocking position 231. To be able to resolve and vacate the blocking position 231 as quickly as possible, an oscillation O of the force F moving the shifting element 235 is imposed on the movement of the shifting element 235. The force F with the oscillation O forms the control variable 255 for the movement of the shifting element 235 and is shown as a thin (fine) solid line. The oscillation O is a periodic change of the force F about the target variable Z. The force F thus changes in an alternating manner and is alternatingly smaller and larger than the target variable Z.

The oscillation O has an amplitude and a frequency H. The oscillation O and, in particular its frequency H, depends on the speed difference DH between the shifting element 235 and further shifting element 236. In the force-controlled case according to FIG. 2, the control signal 255 is determined such that the maximum force F, that is, the sum of the amplitudes of the target variable Z and the oscillation O, falls below a force threshold FT. Alternatively, the position P of the shifting element 235 can also be controlled via a velocity and/or position control. Then the amplitude and/or frequency are determined such that a force resulting from the oscillation remains below the force threshold FT.

After the shifting element 235 has vacated the blocking position 231, the shifting element 235 is moved in a force-controlled manner, as indicated by the curvature of the position P (increasing from the flat portion of the dot/dash line indicated at 237) and the solid line as an adjusted control variable 255'. The vacating of the blocking position 231 can be determined by way of the position P and/or the velocity of the shifting element 235. The shifting element 235 now moves into the end position 233. The force F as target variable Z no longer has any oscillation O. The oscillation O is stopped when the blocking position 231 is vacated.

Figure 3:
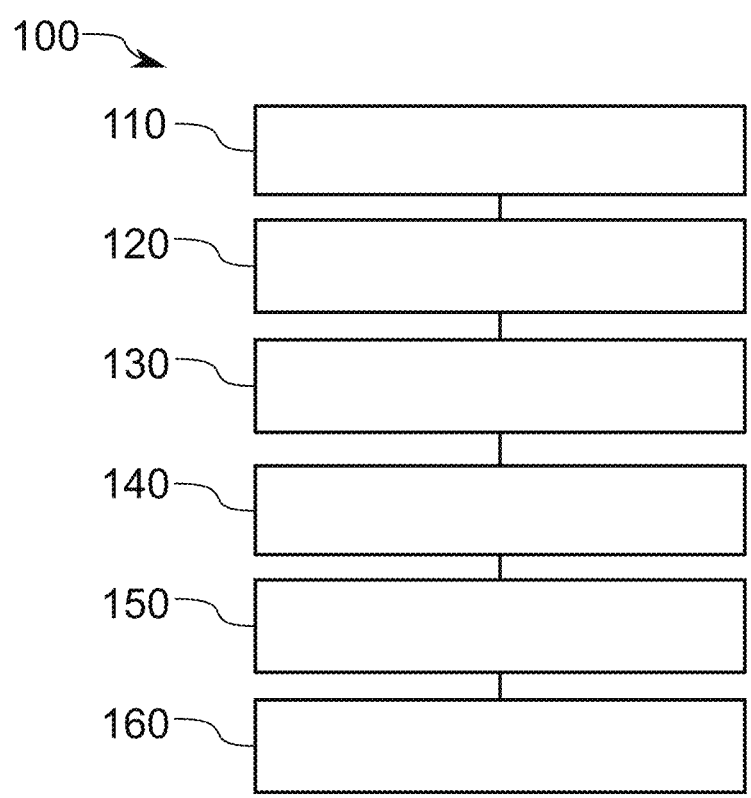
FIG. 3 is a schematic illustration of a sequence of a method according to an embodiment of the present disclosure.

FIG. 3 shows a schematic illustration of a sequence of a method 100 according to one embodiment of the present disclosure. The method 100 is a method 100 for shifting an electrically shiftable transmission 230 for a vehicle 200a, in particular a commercial vehicle 200b. Such a vehicle 200a, 200b is described with reference to FIG. 1. A movement profile 300 for shifting an electrically shiftable transmission 230 is described with reference to FIG. 2. FIG. 3 is described with reference to FIGS. 1 and 2.

The method 100 according to FIG. 3 comprises: detecting 110 a state 237 of the shifting element 235 relating to a blocking position 231 of a shifting element 235 of the transmission 230. The state 237 represents the blocking position 231 and/or the state 237 indicates the blocking position 231 being present resulting from a movement of the shifting element 235 toward the further shifting element 236.

A control signal 255 is determined 120 for controlling a movement of the shifting element 235 taking into account the detection of the state 237 and/or the blocking position 231, wherein the control signal 255 defines a target variable Z of the movement of the shifting element 235 and an oscillation O about the target variable Z. The determination 120 of the control signal 255 is carried out such that a force F on the shifting element 235 falls below a force threshold FT. The target variable Z is a force F, a velocity, and/or a position P. The oscillation O defines a frequency H of the movement of the shifting element 235. The oscillation O is dependent on a speed difference DH between the shifting element 235 and the further shifting element 236 that can be brought into operative connection with the shifting element 235.

The control signal 255 is output 130 to move the shifting element 235 based on the control signal 255.

The method 100 further comprises: detecting 140 or determining the vacating of the blocking position 231.

An adjusted control signal 255' is determined 150 for controlling the movement of the shifting element 235 after the blocking position 231 has been vacated, wherein the adjusted control signal 255' defines a target variable Z of the movement of the shifting element 235 without the oscillation O.

The adjusted control signal 255' is output 160 to move the shifting element 235 based on the adjusted control signal 255'.

| Reference Symbols (part of the description) | |
|---|---|
| 100 | Method |
| 110 | Detecting |
| 120 | Determining |
| 130 | Outputting |
| 140 | Detecting |
| 150 | Determining |
| 160 | Outputting |
| 200a | Vehicle |
| 200b | Commercial vehicle |
| 205 | Axle arrangement |
| 230 | Electrically shiftable transmission |
| 231 | Blocking position |
| 232 | Shift actuator |
| 233 | Neutral position |
| 234 | End position |
| 235 | Shifting element |
| 236 | Further shifting element |
| 237 | State |
| 238 | Position sensor |
| 250 | Control device |
| 255 | Control signal |
| 255' | Adjusted control signal |
| 300 | Movement profile |
| DH | Speed difference |
| H | Frequency |
| F | Force |
| FT | Force threshold |
| O | Oscillation |

| Reference Symbols (part of the description) | |
|---|---|
| P | Position |
| t | Time |
| Z | Target variable |

The invention claimed is:

1. A method (100) for shifting an electrically shiftable transmission (230) for a vehicle (200a, 200b), the method (100) comprising:
    detecting (110) a state (237) of a shifting element (235) of the transmission (230) relating to a blocking position (231) of the shifting element (235) relative to a further shifting element (236);
    determining (120) a control signal (255) for controlling a movement of the shifting element (235) based on the detected state (237) and/or the blocking position (231), wherein the control signal (255) defines a target variable (Z) of the movement of the shifting element (235) and an oscillation (O) about the target variable (Z); and
    outputting (130) the control signal (255) and moving the shifting element (235) based on the control signal (255).

2. The method (100) according to claim 1, wherein the state (237) represents an actual detected blocking position (231) and/or the state (237) indicates a predicted blocking position (231) resulting from a movement of the shifting element (235) toward the further shifting element (236).

3. The method (100) according to claim 1, wherein the target variable (Z) is a force (F), a velocity, and/or a position (P).

4. The method (100) according to claim 1, wherein the oscillation (O) defines a frequency (H) of the movement of the shifting element (235).

5. The method (100) according to claim 1, wherein the oscillation (O) is dependent on a speed difference (DH) between the shifting element (235) and the further shifting element (236) configured to be brought into operative connection with the shifting element (235).

6. The method (100) according to claim 1, wherein the determining (120) of the control signal (255) is carried out such that a force (F) on the shifting element (235) falls below a force threshold (FT).

7. The method (100) according to claim 1, wherein the method (100) further comprises:
    detecting (140) a vacating of the blocking position (231);
    determining (150) an adjusted control signal (255') for controlling the movement of the shifting element (235) after the vacating of the blocking position (231) is detected, wherein the adjusted control signal (255') defines a target variable (Z) of the movement of the shifting element (235) without the oscillation (O); and
    outputting (160) the adjusted control signal (255') and moving the shifting element (235) based on the adjusted control signal (255').

8. The method (100) according to claim 7, further comprising moving the shifting element (235) from the blocking position into a final position (234) engaged with the further shifting element (236).

9. The method according to claim 8, further comprising, prior to detecting the state (237) relating to the blocking position (231), moving the shifting element (235) from a neutral position (233) toward the further shifting element (236).

10. The method according to claim 9, further comprising, prior to reaching the blocking position (231) with the shifting element (235), reducing a value of the target variable (Z) of the control signal (255) Z.

11. The method according to claim 10, wherein a value of the target variable of the adjusted control signal (255') after vacating the blocking position (231) is less than the value of the target variable of the control signal (255) that is achieved prior to reaching the blocking position (231).

12. A non-transitory computer-readable medium having instructions stored thereon and comprising commands which, when the commands are executed by a computer having a processor, cause the computer to carry out the method (100) according to claim 1.

13. A control device (250) for a vehicle (200a, 200b) with an electrically shiftable transmission (230), wherein the control device (250) is configured to carry out the method (100) according to claim 1.

14. An electrically shiftable transmission (230) having a shifting element (235) and a control device (250) according to claim 13.

15. An axle arrangement (205) for a vehicle (200a, 200b), wherein the axle arrangement (205) includes an electrically shiftable transmission (230) according to claim 14.

16. A vehicle (200a, 200b) having an axle arrangement (205) according to claim 15.

17. A vehicle (200a, 200b) having an electrically shiftable transmission (230) according to claim 14.

18. The method according to claim 1, wherein the target variable of the control signal is a force, where the force is held at a constant value during movement of the shifting element (235) from a neutral position (233) toward the further shifting element (236), wherein a position of the shifting element increases at an exponential rate while the force is held constant, wherein the force is reduced from its constant value as the shifting element (235) approaches the further shifting element (236) and before an initial engagement therebetween.

19. The method according to claim 1, wherein the state (237) of the shifting element (235) is detected in response to detecting a position of the shifting (235) element via a position sensor (238), wherein the position of the shifting element (235) does not change over a predetermined time interval.

20. The method according to claim 1, wherein the state (237) of the shifting element (235) indicates the blocking position resulting from a movement of the shifting element (235), wherein the blocking position (231) is predicted based on a predicted movement of the shifting element (235), wherein the movement of the shifting element (235) is detected and, based on a prediction of a position of the shifting element, it is determined that a further movement of the shifting element (235) will potentially result in the blocking position (231).

* * * * *